United States Patent
Kikuchi et al.

(10) Patent No.: US 9,608,468 B2
(45) Date of Patent: Mar. 28, 2017

(54) CHARGE CONTROL APPARATUS AND CHARGE CONTROL METHOD

(75) Inventors: Yoshiaki Kikuchi, Toyota (JP);
Masahiko Kubo, Nisshin (JP);
Yoshihiko Hiroe, Toyota (JP);
Motoyoshi Okumura, Chiryu (JP);
Kimihito Nakamura, Toyota (JP);
Hideki Kawamura, Chita-gun (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 243 days.

(21) Appl. No.: 14/349,406

(22) PCT Filed: Oct. 4, 2011

(86) PCT No.: PCT/JP2011/072838
§ 371 (c)(1),
(2), (4) Date: Apr. 3, 2014

(87) PCT Pub. No.: WO2013/051104
PCT Pub. Date: Apr. 11, 2013

(65) Prior Publication Data
US 2014/0247018 A1 Sep. 4, 2014

(51) Int. Cl.
*H02J 7/04* (2006.01)
*H02J 7/16* (2006.01)
(Continued)

(52) U.S. Cl.
CPC .......... *H02J 7/0091* (2013.01); *B60L 3/0046* (2013.01); *B60L 11/187* (2013.01);
(Continued)

(58) Field of Classification Search
CPC ........ H02J 7/0091; H02J 7/007; H02J 7/0031; H02J 7/047; H02J 7/0029; H02J 7/044;
(Continued)

(56) References Cited

U.S. PATENT DOCUMENTS 6,075,346 A 6/2000 Kikuchi et al.
2006/0082346 A1 4/2006 Nagasawa
(Continued)

FOREIGN PATENT DOCUMENTS

JP 0865910 A 3/1996
JP 11-187577 A 7/1999
(Continued)

*Primary Examiner* — Nha Nguyen
(74) *Attorney, Agent, or Firm* — Sughrue Mion, PLLC

(57) ABSTRACT

ECU executes program including the steps of turning on an overcharge tentative determination flag and performing limitation on Win in a case where a rising rate $\Delta TB$ is higher than or equal to $\Delta TB(0)$, and a current average value IBs is a value on a side of charging, and the steps of turning off the overcharge tentative determination flag and cancelling the limitation on Win in a case where the rising rate $\Delta TB$ is lower than or equal to $\Delta TB(1)$, or the current average value IBs exhibits a value on a side of discharging, and the steps of determining that a battery is in the overcharging state and executing a fail safe process in a case where the integrated value IBs of current from a time point at which the overcharge tentative determination flag is switched from an off-state to an on-state becomes greater than or equal to IBs(0).

10 Claims, 6 Drawing Sheets

(51) Int. Cl.
  *H02J 7/00* (2006.01)
  *H01M 10/44* (2006.01)
  *H01M 10/48* (2006.01)
  *B60L 3/00* (2006.01)
  *B60L 11/18* (2006.01)

(52) U.S. Cl.
  CPC ....... *B60L 11/1861* (2013.01); *H01M 10/443* (2013.01); *H01M 10/486* (2013.01); *H02J 7/007* (2013.01); *H02J 7/0029* (2013.01); *H02J 7/0031* (2013.01); *H02J 7/044* (2013.01); *H02J 7/047* (2013.01); *B60L 2240/545* (2013.01); *H01M 2220/20* (2013.01); *H02J 2007/0037* (2013.01); *Y02T 10/7005* (2013.01); *Y02T 10/705* (2013.01); *Y02T 10/7044* (2013.01)

(58) Field of Classification Search
  CPC ............ H02J 2007/0037; B60L 11/187; B60L 11/1861; B60L 3/0046; B60L 2240/545; H01M 10/486; H01M 10/443; H01M 2220/20; Y02T 10/705; Y02T 10/7044; Y02T 10/7005
  See application file for complete search history.

(56) References Cited

U.S. PATENT DOCUMENTS

| | | | |
|---|---|---|---|
| 2007/0069691 A1* | 3/2007 | Fukuda | H02J 7/0073 320/128 |
| 2007/0118255 A1* | 5/2007 | Wakashiro | B60K 6/485 701/22 |
| 2008/0048619 A1 | 2/2008 | Yoshida | |
| 2010/0253285 A1* | 10/2010 | Takahashi | H02J 7/0016 320/118 |

FOREIGN PATENT DOCUMENTS

| | | |
|---|---|---|
| JP | 11252808 A | 9/1999 |
| JP | 2000014028 A | 1/2000 |
| JP | 2001-327094 A | 11/2001 |
| JP | 2008043188 A | 2/2008 |

\* cited by examiner

CHARGE CONTROL APPARATUS AND CHARGE CONTROL METHOD

CROSS REFERENCE TO RELATED APPLICATIONS

This application is a National Stage of International Application No. PCT/JP2011/072838 filed Oct. 4, 2011, the contents of all of which are incorporated herein by reference in their entirety.

TECHNICAL FIELD

The present invention relates to a technology of appropriately limiting charging in accordance with a state of an electrical storage device.

BACKGROUND ART

Japanese Patent Laying-Open No. 11-187577 (PTD 1) discloses a technology of avoiding overcharging/overdischarging of a battery by setting an upper limit value of charging/discharging power of a battery in accordance with a battery temperature.

CITATION LIST

Patent Document

PTD 1: Japanese Patent Laying-Open No. 11-187577

SUMMARY OF INVENTION

Technical Problem

In the case of determining an upper limit value of charging power of a battery based on a battery temperature, particularly under a low-temperature environment, there is a disadvantage that charging cannot be limited appropriately unless the battery temperature exceeds an allowable temperature even when a charge control is not performed appropriately due to an abnormality in a charging system. Further, in the case where the charge control is not performed appropriately, it is desirable to promptly stop charging.

An object of the present invention is to provide a charge control apparatus and a charge control method appropriately limiting charging and promptly stopping charging in the case where an abnormality occurs in a charge system.

Solution to Problem

A charge control apparatus according to one aspect of the present invention is a charge control apparatus for controlling charging of an electrical storage device for supplying power to electric equipment. This charge control apparatus includes a detection device for detecting a temperature of the electrical storage device, and a control device for lowering an upper limit value of charging power of the electrical storage device when the temperature of the electrical storage device rises due to charging of the electrical storage device, and determining that the electrical storage is in an overcharging state when charging continues in a state where the upper limit value is lowered, and a rise in the temperature of the electrical storage device continues.

Preferably, when a rising rate of the temperature of the electrical storage device is higher than a first threshold value, the control device sets the upper limit value of the charging power to be lower as compared to a case where the rising rate is lower than the first threshold value.

More preferably, when the temperature of the electrical storage device is high, the control device sets the first threshold value so that the first threshold value is higher as compared to an instance where a temperature of the electrical storage device is low.

More preferably, the detection device detects temperatures at a plurality of parts of the electrical storage device. The control device lowers the upper limit value of the charging power when the rising rate of a temperature at any one part among the plurality of parts is higher than the first threshold value.

More preferably, when charging continues until an integrated value of a current to the electrical storage device becomes greater than a predetermined value after the upper limit value of the charging power is lowered, and the rising rate of the temperature of said electrical storage device does not become lower than a second threshold value, the control device determines that the electrical storage device is in the overcharging state. The second threshold value is a value less than or equal to the first threshold value.

More preferably, in at least any one of a case where the rising rate is lower than the second threshold value and a case where the electrical storage device is discharging, the control device cancels lowering of the upper limit value of the charging power.

More preferably, when the control device determines that the electrical storage device is in the overcharging state, the control device stops charging of the electrical storage device.

More preferably, the electrical storage device is provided with a cooling device for cooling the electrical storage device. When the cooling device is in operation in a case where a temperature of the electrical storage device rises due to charging of the electrical storage device, the control device does not change an operation amount of the cooling device while the upper limit value is lowered.

More preferably, the electrical storage device is provided with a cooling device for cooling the electrical storage device. When operation of the cooling device is started, the control device does not perform determination on whether or not the electrical storage device is in the overcharging state.

More preferably, when the temperature of the electrical storage device rises due to charging of the electrical storage device, the control device lowers the upper limit value of the charging power and lowers an upper limit value of discharging power of the electrical storage device.

More preferably, the charge control apparatus is mounted to a vehicle having an electric motor for driving. The electrical storage device provides power to and receives power from the electric motor for driving.

A charge control method according to another aspect of the present invention is a charge control method of controlling charging of an electrical storage device for supplying power to electric equipment. The charge control method includes the steps of lowering an upper limit value of charging power of the electrical storage device when a temperature of the electrical storage device rises due to charging of the electrical storage device, and determining that the electrical storage device is in an overcharging state when charging continues in a state where the upper limit value is lowered, and a rise in the temperature of the electrical storage device continues.

Advantageous Effects of Invention

According to the present invention, an upper limit value of charging power is lowered in accordance with a rise in temperature of an electrical storage device due to charging, so that the upper limit value of the charging power of the electrical storage device can be limited appropriately even in the case where the temperature of the electrical storage device is low. Further, when the rise in temperature of the electrical storage device continues in the case where charging continues in the state where the upper limit value is lowered, it can be determined that the electrical storage device is in an overcharging state. By specifying that the electrical storage device is in the overcharging state, charging can be stopped promptly. Thus, a charge control apparatus and a charge control method can be provided which appropriately limit charging and stop charging promptly in the case where an abnormality occurs in a charge system

DESCRIPTION OF EMBODIMENTS

Figure 1:
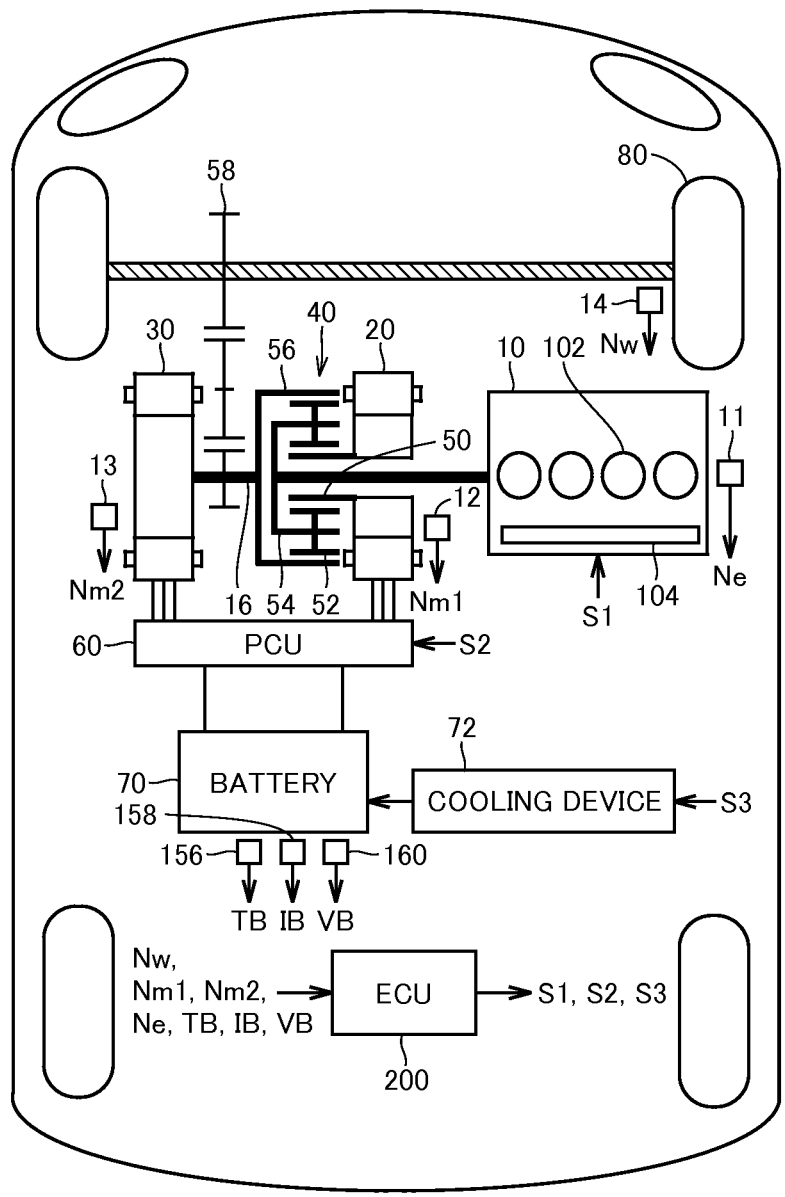
FIG. 1 is an overall block diagram of a vehicle according to the present embodiment.

Hereinafter, embodiments of the present invention will be described with reference to the drawings. In the following description, the same parts have the same reference numerals allotted. They are named and function the same. Thus, detailed description thereof will not be repeated.

Referring to FIG. 1, an overall block diagram of a hybrid vehicle 1 (hereinafter, simply referred to as "vehicle 1") according to the present embodiment will be described. Vehicle 1 includes an engine 10, a drive shaft 16, a first motor generator (hereinafter, referred to as "first MG") 20, a second motor generator (hereinafter, referred to as "second MG") 30, a motive power split device 40, a reducer 58, a PCU (Power Control Unit) 60, a battery 70, a cooling device 72, drive wheels 80, and an ECU (Electronic Control Unit) 200.

Vehicle 1 runs with use of a driving force outputted from at least one of engine 10 and second MG 30. Motive power generated by engine 10 is split into two paths by motive power split device 40. One path among the two paths is for transmission to drive wheels 80 via reducer 58, and the other path is for transmission to first MG 20.

First MG 20 and second MG 30 are three-phase alternate current rotating electrical machines. First MG 20 and second MG 30 are driven by PCU 60.

First MG 20 serves as a generator for generating power with use of motive power of engine 10 split by motive power split device 40, and charging battery 70 via PCU 60. Further, first MG 20 receives power from battery 70 to rotate a crank shaft which is an output shaft of engine 10. Accordingly, first MG 20 serves as a starter for starting engine 10.

Second MG 30 serves as a driving motor using at least any one of power stored in battery 70 and power generated by first MG 20 to provide driving force to drive wheels 80. Further, second MG 30 also serves as a generator for charging battery 70 via PCU 60 with use of power generated by regenerative braking.

Engine 10 is an internal combustion engine, such as a gasoline engine or a diesel engine. Engine 10 includes a plurality of cylinders 102, and a fuel injection device 104 for supplying fuel to each of the plurality of cylinders 102. It is only necessary to provide at least one cylinder 102.

Fuel injection device 104 injects an appropriate amount of fuel to each cylinder at an appropriate timing and stops injection of fuel to each cylinder, in accordance with a control signal S1 from ECU 200.

Further, at a position facing the crank shaft of engine 10, an engine rotational speed sensor 11 is provided. Engine rotational speed sensor 11 detects a rotational speed (hereinafter, referred to as "engine rotational speed") Ne of the crank shaft of engine 10. Engine rotational speed sensor 11 transmits a signal indicating detected engine rotational speed Ne to ECU 200.

Motive power split device 40 is a motive power transmission device mechanically coupling each of three elements including a drive shaft 16 coupled to drive wheels 80, an output shaft of engine 10, and a rotational shaft of first MG 20. Motive power split device 40 uses any one of the three elements described above as a reaction force element to enable transmission of motive power between the other two elements. The rotational shaft of second MG 30 is coupled to drive shaft 16.

Motive power split device 40 is a planetary gear mechanism including a sun gear 50, a pinion gear 52, a carrier 54, and a ring gear 56. Pinion gear 52 is in mesh with each of sun gear 50 and ring gear 56. Carrier 54 rotatably supports pinion gear 52 and is coupled to the crank shaft of engine 10. Sun gear 50 is coupled to a rotational shaft of first MG 20. Ring gear 56 is coupled to a rotational shaft of second MG 30 and reducer 58 through drive shaft 16.

Reducer 58 transmits motive power from motive power split device 40 or second MG 30 to drive wheels 80. Further, reducer 58 transmits a reaction force, which is received at drive wheels 80 from a road surface, to motive power split device 40 and second MG 30.

PCU 60 converts direct current power stored in battery 70 into alternate current power for driving first MG 20 and second MG 30. PCU 60 includes a converter and an inverter (neither illustrated in the drawings) controlled in accordance with control signal S2 from ECU 200. The converter boosts a voltage of direct current power received from battery 70 and outputs the direct current power to the inverter. The inverter converts the direct current power outputted from the converter into alternate current power and outputs the alternate current power to first MG 20 and/or second MG 30. Accordingly, first MG 20 and/or second MG 30 are driven with use of the power stored in battery 70. Further, the inverter converts alternate current power generated by first MG 20 and/or second MG 30 into direct current power and outputs the direct current power to the converter. The converter steps down the voltage of the direct current power outputted from the inverter and outputs the direct current power to battery 70. Accordingly, battery 70 is charged with use of the power generated by first MG 20 and/or second MG 30. It should be noted that the converter may be omitted.

Battery 70 is an electrical storage device, and is a rechargeable direct current power supply. A secondary battery of nickel-metal hydride, lithium-ion, or the like is used as battery 70. The voltage of battery 70 is, for example, about 200V. Battery 70 may be charged with use of power generated by first MG 20 and/or second MG 30 as described above, and may also be charged with use of power supplied from an external power supply (not illustrated). Not limited to the secondary battery, battery 70 is only necessary to be an electrical storage device having characteristics that a rise in temperature continues in the case where charging continues in an overcharging state. The electrical storage device may be a capacitor as long as it has the characteristics described above.

Battery 70 is provided with a battery temperature sensor 156, a current sensor 158, and a voltage sensor 160.

Battery temperature sensor 156 detects a battery temperature TB of battery 70. Battery temperature sensor 156 transmits a signal indicating battery temperature TB to ECU 200. Battery temperature sensor 156 may include a plurality of temperature sensors. For example, the plurality of temperature sensors are provided respectively at a plurality of parts so that a temperature distribution of whole battery 70 can be detected. The plurality of temperature sensors may be provided for each battery cell or each battery module. The plurality of temperature sensors transmit each of battery temperatures detected at the plurality of parts to ECU 200.

Current sensor 158 detects a current IB of battery 70. Current sensor 158 transmits a signal indicating current IB to ECU 200.

Voltage sensor 160 detects a voltage VB of battery 70. Voltage sensor 160 transmits a signal indicating voltage VB to ECU 200.

ECU 200 estimates a state of charge (hereinafter, will be referred to as SOC (State Of Charge)) of battery 70 in accordance with current IB, voltage VB, and battery temperature TB of battery 70. For example, ECU 200 may estimate an OCV (Open Circuit Voltage) in accordance with current IB, voltage VB, and battery temperature TB, and estimate the SOC of battery 70 in accordance with the estimated OCV and a predetermined map. Alternatively, for example, ECU 200 may estimate the SOC of battery 70 by integrating a charging current and a discharging current of battery 70.

When controlling the charging amount and the discharging amount of battery 70, ECU 200 sets an upper limit value of input power allowed during charging of battery 70 (in the following description, referred to as "charging power upper limit value Win") and an upper limit value of output power allowed during discharging of battery 70 (in the following description, referred to as "discharging power upper limit value Wout") in accordance with battery temperature TB and a current SOC.

For example, when the present SOC is lowered, discharging power upper limit value Wout is lowered gradually. On the other hand, when the present SOC is raised, charging power upper limit value Win is lowered gradually. In the present embodiment, discharging power upper limit value Wout and charging power upper limit value Win are described as exhibiting positive values for convenience of description. However, discharging power upper limit value Wout may exhibit a positive value, and charging power upper limit value Win may exhibit a negative value.

A secondary battery used as battery 70 has a temperature dependency that an internal resistance rises when the temperature is low. Further, when the temperature is high, it is necessary to prevent excessive rise in the temperature due to further generation of heat. Therefore, when battery temperature TB is low and high, it is preferable to lower each of discharging power upper limit value Wout and charging power upper limit value Win. ECU 200 sets charging power upper limit value Win and discharging power upper limit value Wout by using, for example, a map or the like in accordance with battery temperature TB and the present SOC.

Cooling device 72 cools battery 70. For example, cooling device 72 includes a cooling fan and a cooling duct. Cooling device 72 cools battery 70 by supplying air, which is taken in through the cooling duct with an operation of the cooling fan, to battery 70. An air inlet of the cooling duct is provided, for example, in a cabin of vehicle 1. The cooling fan is operated in accordance with a control signal S3 from ECU 200.

A first resolver 12 is provided in first MG 20. First resolver 12 detects a rotational speed Nm1 of first MG 20. First resolver 12 transmits a signal indicating detected rotational speed Nm1 to ECU 200.

A second resolver 13 is provided in second MG 30. Second resolver 13 detects a rotational speed Nm2 of second MG 30. Second resolver 13 transmits a signal indicating detected rotational speed Nm2 to ECU 200.

A wheel speed sensor 14 detects a rotational speed Nw of drive wheels 80. Wheel speed sensor 14 transmits a signal indicating detected rotational speed Nw to ECU 200. ECU 200 calculates a speed V of vehicle 1 in accordance with received rotational speed Nw. ECU 200 may calculate speed V of vehicle 1 in accordance with rotational speed Nm2 of second MG 30 in place of rotational speed Nw.

ECU 200 generates control signal S1 for controlling engine 10, and outputs generated control signal S1 to engine 10. Further, ECU 200 generates control signal S2 for controlling PCU 60, and outputs generated control signal S2 to PCU 60. ECU 200 generates control signal S3 for controlling cooling device 72, and outputs generated control signal S3 to cooling device 72.

ECU 200 controls engine 10, PCU 60, and the like to control a whole hybrid system, in other words, a charging/discharging state of battery 70 and an operation state of engine 10, first MG 20, and second MG 30 so that vehicle 1 can run most efficiently.

In vehicle 1 having the configuration as described above, running only with use of second MG 30 is performed in the case where engine 10 is inefficient during starting, low-speed running, or the like. Further, during normal running, motive power split device 40 splits motive power of engine 10 into two paths of motive power. The motive power on one path directly drives drive wheels 80. The motive power on the other path drives first MG 20 to generate power. At this time, ECU 200 uses the generated power to drive second MG 30. With driving of second MG 30 in such a manner, driving of drive wheels 80 is supported.

During deceleration of vehicle 1, second MG 30 driven by rotation of drive wheels 80 serves as a generator to perform regenerative braking. Power collected by the regenerative braking is stored in battery 70. When charging is especially required due to lowering in the SOC of battery 70, ECU 200 increases an output of engine 10 to increase the amount of power generated by first MG 20. Accordingly, the SOC of battery 70 is increased. Further, in some cases, ECU 200 performs a control of increasing driving force from engine 10 as needed even during the low-speed running. For example, such control is performed in the case where charging of battery 70 is required as described above, the case where auxiliary machines such as an air conditioner and the like are driven, the case where the temperature of coolant water of engine 10 is raised to a predetermined temperature, and the like.

ECU 200 calculates requested power corresponding to a pressed amount of an acceleration pedal. Further, ECU 200 calculates a requested charging/discharging amount Pchg in accordance with a present SOC of battery 70. ECU 200 controls torque of first MG 20 and second MG 30 and an output of engine 10 in accordance with the calculated requested power and requested charging/discharging amount Pchg.

ECU 200 calculates requested charging/discharging amount Pchg in accordance with, for example, the present SOC of battery 70 and the predetermined map. The predetermined map defines that, for example, requested charging/discharging amount Pchg exhibits zero when the present SOC is at a threshold value SOC (0) (for example, 50%). The predetermined map defines requested charging/discharging amount Pchg so that discharging is requested in the case where the present SOC is greater than threshold value SOC (0). Further, the predetermined map defines requested charging/discharging amount Pchg so that charging is requested when the present SOC is smaller than threshold value SOC(0).

Further, the predetermined map defines requested charging/discharging amount Pchg within a predetermined range of SOC. An upper limit value and a lower limit value of the predetermined range are values defined in accordance with a kind and characteristics of battery and adapted by experiment and design. The lower limit value of the predetermined range is, for example, 20%. The upper limit value of the predetermined range is, for example, 80%.

Vehicle 1 is controlled in accordance with the requested power and requested charging/discharging amount Pchg, so that the SOC of battery 70 is controlled to change within a predetermined range with a center at threshold value SOC (0). Accordingly, the stabilization in the balance of SOC in battery 70 is achieved.

The case is assumed where ECU 200 controls the SOC of battery 70, and charging power upper limit value Win of battery 70 is set in accordance with battery temperature TB. In this case, particularly under the low-temperature environment, charging sometimes cannot be limited appropriately unless battery temperature TB exceeds an allowable temperature even in the case where the charge control is not performed appropriately due to an abnormality in the charge system. Further, in the case where the charge control is not performed appropriately, it is desirable to promptly stop charging.

The abnormality in the charge system includes, for example, the abnormality that the SOC of battery 70 cannot be estimated accurately due to a failure in voltage sensor 160. The failure in voltage sensor 160 includes a failure mode in which voltage sensor 160 outputs a value offset from a true value beyond an error range. The case where the charge control is not performed appropriately includes the case where battery 70 exhibits an overcharging state as a result of an inaccurate estimation of the SOC of battery 70.

The present embodiment is characterized in that ECU 200 lowers charging power upper limit value Win of battery 70 when battery temperature TB of battery 70 rises due to charging of battery 70, and that ECU 200 determines that battery 70 is in an overcharging state when charging continues in a state where charging power upper limit value Win is lowered, and rise in the temperature of battery 70 continues.

Specifically, in the case where a rising rate $\Delta TB$ of battery temperature TB is higher than a threshold value $\Delta TB(0)$, ECU 200 sets charging power upper limit value Win to be lower as compared to a case where rising rate $\Delta TB$ is lower than threshold value $\Delta TB(0)$.

Further, in the case where charging continues until an integrated value IBs of a current to battery 70 becomes greater than a threshold value IBs(0) after charging power upper limit value Win is lowered, and rising rate $\Delta TB$ does not become lower than a threshold value $\Delta TB(1)$, ECU 200 determines that battery 70 is in the overcharging state. Threshold value $\Delta TB(1)$ is a value less than or equal to threshold value $\Delta TB(0)$.

Figure 2:
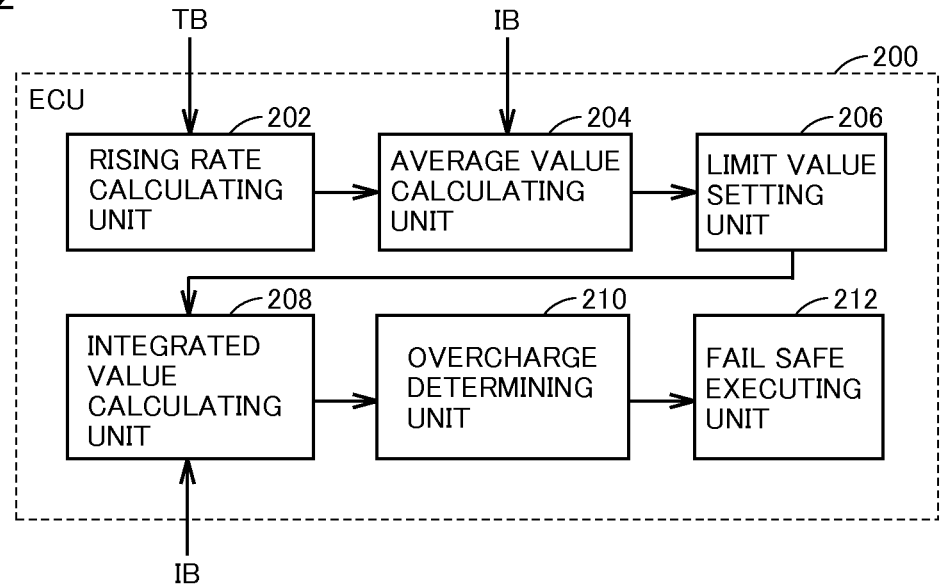
FIG. 2 is a functional block diagram of an ECU mounted to the vehicle according to the present embodiment.

FIG. 2 is a functional block diagram of ECU 200 mounted to vehicle 1 according to the present embodiment. ECU 200 includes a rising rate calculating unit 202, an average value calculating unit 204, a limit value setting unit 206, an integrated value calculating unit 208, an overcharge determining unit 210, and a fail safe executing unit 212.

Rising rate calculating unit 202 calculates rising rate $\Delta TB$ of battery temperature TB received from battery temperature sensor 156. For example, rising rate $\Delta TB$ is the amount of rise in battery temperature TB within a preset time period.

The preset time period is a time period set in accordance with characteristics, a magnitude of charging current, and the like of battery 70. The preset time period is a time period required for the rise in temperature by a predetermined temperature (for example, 1 to 2° C.) in the case where charging continues in the overcharging state. The preset time period is a time period of, for example, ten seconds to several minutes. The predetermined temperature is set based on, for example, the accuracy of battery temperature sensor 156.

In the case where battery temperature sensor 156 includes a plurality of temperature sensors, rising rate $\Delta TB$ for each of the plurality of temperature sensors is calculated.

Average value calculating unit 204 calculates an average value IBa of current IB. The time period subjected to the calculation of average value IBa may be the preset time period described above, or may be a time period longer than the preset time period described above. The time period subjected to the calculation of average value IBa is only necessary to be the time period during which the rise in rising rate $\Delta TB$ of battery temperature TB can be determined as being caused by charging.

Limit value setting unit 206 determines whether or not the state of battery 70 is in a first state where rising rate $\Delta TB$ of battery temperature TB is higher than or equal to threshold value $\Delta TB(0)$, and average value IBa has a value on the charging side.

In the present embodiment, limit value setting unit 206 sets threshold value $\Delta TB(0)$ in accordance with, for example, battery temperature TB and the predetermined map.

Figure 3:
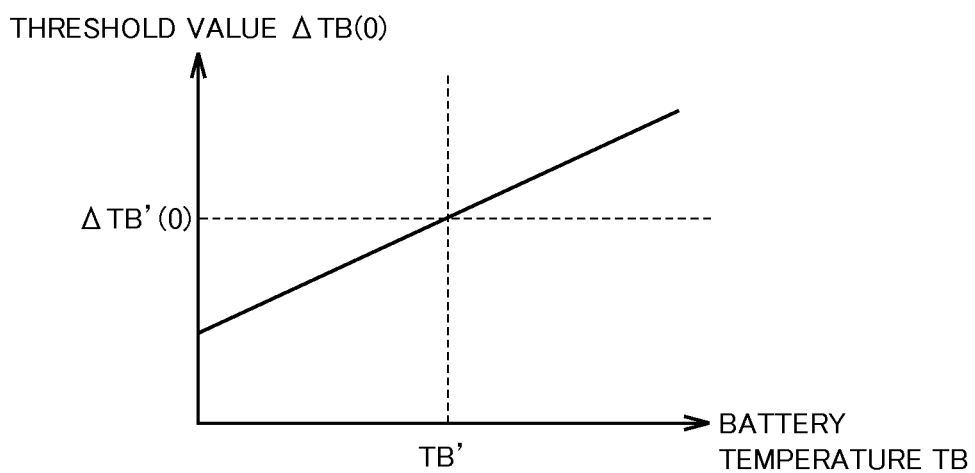
FIG. 3 represents a relationship between a battery temperature and a threshold value according to the present embodiment.

The predetermined map is, for example, the map shown in FIG. 3. The vertical axis in FIG. 3 represents threshold value $\Delta TB(0)$, and the horizontal axis in FIG. 3 represents battery temperature TB of battery 70. As shown in FIG. 3, when battery temperature TB of battery 70 is high, limit value setting unit 206 sets threshold value $\Delta TB(0)$ so that threshold value $\Delta TB(0)$ becomes higher as compared to the case where battery temperature TB is low. For example, when battery temperature TB is at TB', limit value setting unit 206 sets a threshold value $\Delta TB'(0)$ from the map shown in FIG. 3.

The map shown in FIG. 3 is one example, and not particularly limited to a linear relationship in which threshold value ΔTB(0) becomes higher as battery temperature TB becomes higher. For example, it may have a non-linear relationship. Further, threshold value ΔTB(0) may be a predetermined value.

Further, in the case where battery temperature sensor 156 includes a plurality of temperature sensors, limit value setting unit 206 may determine whether or not any one of a plurality of rising rates (in other words, the highest rising rate) calculated in accordance with detection result of the plurality of temperature sensors is higher than or equal to threshold value ΔTB(0).

In the case where a state of battery 70 is in the first state, limit value setting unit 206 sets a limit value Win(1) lower than a normal value Win(0) as charging power upper limit value Win.

Limit value Win(1) is a value which is lower than normal value Win(0), represents minimum charging power required for vehicle 1, and is a value greater than zero. Limit value Win(1) is set in accordance with a state of vehicle 1. For example, limit value Win(1) is a value capable of accepting charging power at least in accordance with requested charging/discharging amount Pchg described above.

Preferably, limit value Win(1) is a value which is as low as possible, and is a value set so that a level of change in behavior of vehicle 1 does not exceed an allowable level of a driver (does not give a feeling of discomfort to a driver). For example, when the accelerator is in an off-state, the control of raising engine rotational speed Ne and the regenerative control using second MG 30 are executed to obtain deceleration appropriate in the running condition of vehicle 1. Further, the regenerative control is desirably executed so that a level of vibration due to rise in engine rotational speed Ne does not exceed an allowable level of a driver when the accelerator is in the off-state. Therefore, limit value Win(1) is desirably a value capable of accepting regenerative power generated by the regenerative control executed as described above when the accelerator is in the off-state.

As described above, normal value Win(0) is a value set in accordance with the SOC of battery 70, battery temperature TB of battery 70, and a running condition of vehicle 1. Normal value Win(0) is a value set in accordance with parameters other than rising rate ΔTB of battery temperature TB.

For example, when the state of battery 70 is in the first state, limit value setting unit 206 may turn on an overcharge tentative determination flag into an on-state.

Further, for example, in the case where the current at the time of discharging exhibits a positive value, and the current at the time of charging exhibits a negative value, and when average value IBa exhibits a value smaller than zero, limit value setting unit 206 may determine that average value IBa is a value on the side of charging.

Limit value setting unit 206 is only necessary to be able to determine whether or not battery 70 is in a charged state during a time period until right before, and it is not limited to determination in accordance with average value IBa of current.

Limit value setting unit 206 determines whether or not battery 70 is in the state where rising rate ΔTB of battery temperature TB is lower than or equal to a threshold value ΔTB(1), or in a second state where average value IBa is a value on the side of discharging.

Threshold value ΔTB(1) is a value less than or equal to threshold value ΔTB(0). Preferably, to prevent hunting due to a change in rising rate ΔTB in the control of charging power upper limit value Win, it is desirable that threshold value ΔTB(1) is a value smaller than threshold value ΔTB(0) by a predetermined value.

Further, in the case where average value IBa exhibits a value greater than zero, limit value setting unit 206 may determine that average value IBa is a value on the side of discharging. Limit value setting unit 206 is only necessary to determine whether or not battery 70 is in a discharged state during the time period until right before, and is not limited to determination in accordance with current average value IBa.

Further, in the case where battery temperature sensor 156 includes a plurality of temperature sensors, limit value setting unit 206 may determine whether or not any of the rising rates (in other words, the highest rising rate) calculated in accordance with detection result of the plurality of temperature sensors is less than or equal to threshold value ΔTB(1).

In the case where battery 70 is in the second state, limit value setting unit 206 sets normal value Win(0) as charging power upper limit value Win.

For example, in the case where battery 70 is in the second state, limit value setting unit 206 may turn the overcharge tentative determination flag into an off-state.

Limit value setting unit 206 sets charging power upper limit value Win so that the amount of change from the previous value does not exceed an upper limit value. The upper limit value of the amount of change is a value which is set so that a level of change in behavior of vehicle 1 due to change in charging power upper limit value Win does not exceed an allowable level of a driver.

For example, the case is assumed where the previous value is normal value Win(0) and is changed to limit value Win(1). In the case where a degree of difference between normal value Win(0) and limit value Win(1) exceeds the upper limit value, limit value setting unit 206 limits the amount of change to the upper limit value. In other words, limit value setting unit 206 sets a value calculated by subtracting the upper limit value of the amount of change from previous value Win(0) as a present time value of charging power upper limit value Win. This similarly applies to the case where the previous value is limit value Win(1) and restored to normal value Win(0). Therefore, detailed description thereof will not be repeated.

In the case where a state of battery 70 is determined as being in the first state (in other words, in the case where the overcharge tentative determination flag is switched from the off-state to the on-state), integrated value calculating unit 208 calculates an integrated value IBs of charging current (hereinafter, referred to as "integrated value of current") from the time point of switching from the off-state to the on-state. Integrated value calculating unit 208, for example, may reset integrated value IBs of current to an initial value (for example, zero) at the time point of switching from the off-state to the on-state and calculate an integrated value of current IB from the initial value. Alternatively, in the case where integration of current is performed on a steady basis, integrated value calculating unit 208 may set integrated value IBs of current at the time point of switching from the off-state to the on-state as the initial value.

In the case where battery 70 is determined as being in the second state (in other words, in the case where the overcharge tentative determination flag is switched from the on-state to the off-state), integrated value calculating unit 208 terminates integration of charging current.

In the case where integrated value IBs of current is greater than or equal to threshold value IBs(0), overcharge determining unit 210 determines that battery 70 is in the overcharging state. For example, in the case where the SOC in accordance with voltage sensor 160 is lower than the SOC corresponding to a fully charged state by a value greater than or equal to threshold value ΔSOC(0), overcharge determining unit 210 may determine that voltage sensor 160 is in an abnormal state. Threshold value ΔSOC(0) is a value greater than an estimated error of the SOC in accordance with an error of the voltage sensor. Threshold value ΔSOC(0) may be a predetermined value, or a value set in accordance with battery temperature TB.

Threshold value IBs(0) is a value set so as not to facilitate deterioration in the case where charging of battery 70 in the overcharging state continues. Threshold value IBs(0) may be a predetermined value, or may be a value set in accordance with battery temperature TB and the like. For example, in the case where battery temperature TB is high, overcharge determining unit 210 may set threshold value IBs(0) so that threshold value IBs(0) becomes smaller as compared to the case where battery temperature TB is low. Preferably, threshold value IBs(0) is a value preventing erroneous determination.

Fail safe executing unit 212, for example, may block a system main relay, not illustrated in the drawings, between PCU 60 and battery 70 to separate battery 70 from the system of vehicle 1. Alternatively, fail safe executing unit 212 may suppress starting of engine 10 and execution of regenerative control to suppress charging of battery 70.

In the present embodiment, rising rate calculating unit 202, average value calculating unit 204, limit value setting unit 206, integrated value calculating unit 208, overcharge determining unit 210, and fail safe executing unit 212 are all described as functions of software achieved by the CPU of ECU 200 executing program stored in a memory, but may be achieved by hardware. Such program is recorded on a recording medium and mounted on a vehicle.

Figure 4:
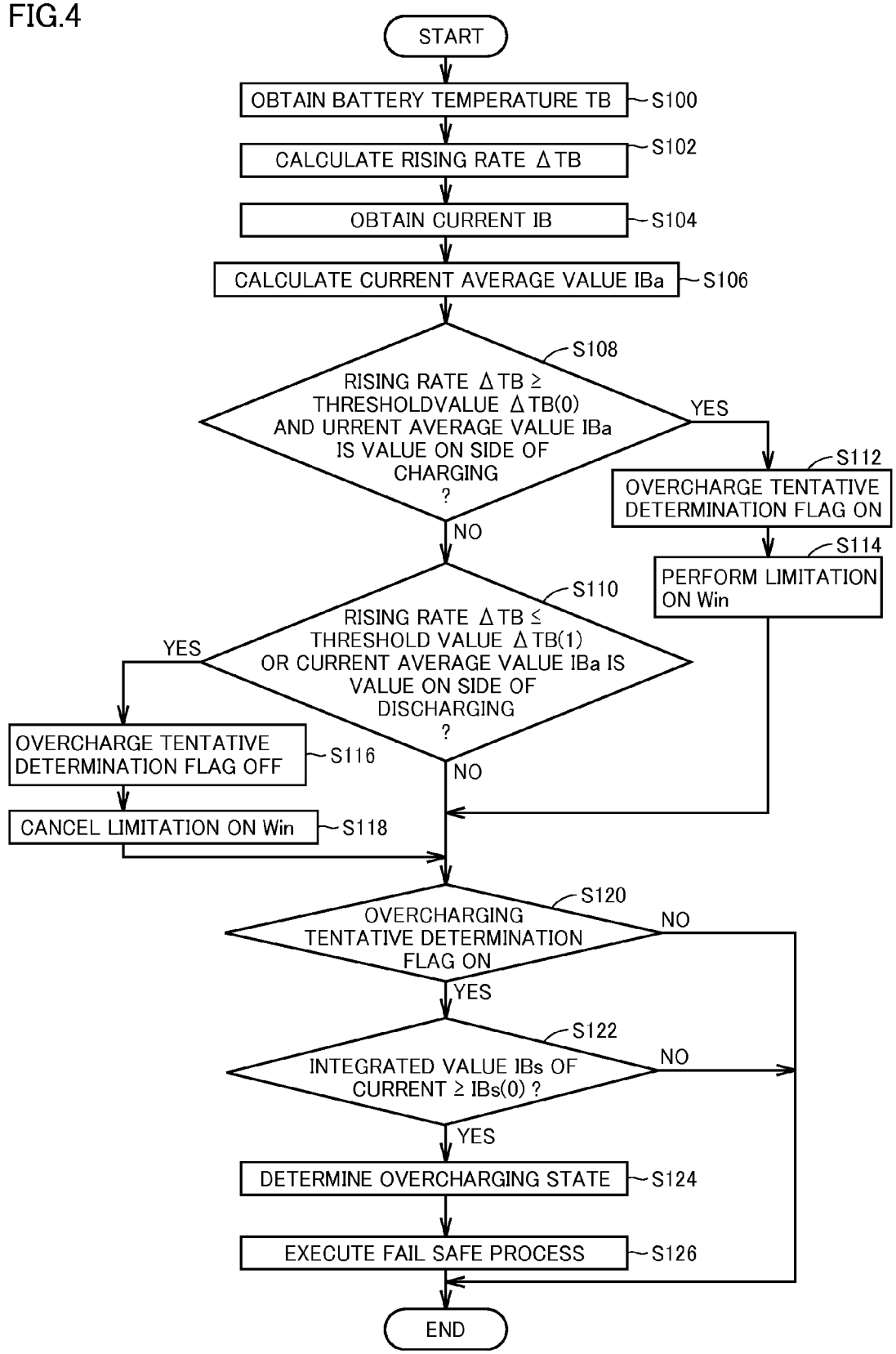
FIG. 4 is a flowchart representing a control structure of a program executed in the ECU mounted to the vehicle according to the present embodiment.

Referring to FIG. 4, a control structure of the program executed by ECU 200 mounted on vehicle 1 according to the present embodiment will be described. ECU 200 executes the program in accordance with the flowchart shown in FIG. 4 at predetermined time intervals.

In step (hereinafter, the term "step" will be referred to as "S") 100, ECU 200 obtains battery temperature TB from battery temperature sensor 156. In S102, ECU 200 calculates rising rate ΔTB of battery temperature TB. In S104, ECU 200 obtains current IB from current sensor 158. In S106, ECU 200 calculates average value IBa of current IB.

In S108, ECU 200 determines whether or not battery 70 exhibits rising rate ΔTB higher than or equal to threshold value ΔTB(0), and is in the first state where average value IBa is a value on the side of charging. In the case where battery 70 is in the first state (YES in S108), the process proceeds to S112. If not so (NO in S108), the process proceeds to S110.

In S110, ECU 200 determines whether or not battery 70 exhibits rising rate ΔTB lower than or equal to threshold value ΔTB(1), or whether or not battery 70 is in the second state in which average value Ma is on the side of discharging. In the case where battery 70 is in the second state (YES in S110), the process proceeds to S116. If not so (NO in S110), the process proceeds to S120.

In S112, ECU 200 turns on the overcharge tentative determination flag to be the on-state. In S114, ECU 200 executes the limit control on charging power upper limit value Win. In other words, ECU 200 sets limit value Win(1) lower than normal value Win(0) as charging power upper limit value Win. In S116, ECU 200 turns the overcharge tentative determination flag to the off-state. In S118, ECU 200 cancels the limit control on charging power upper limit value Win. In other words, ECU 200 sets normal value Win(0) as charging power upper limit value Win.

In S120, ECU 200 determines whether or not the overcharge tentative determination flag is in the on-state. In the case where the overcharge tentative determination flag is in the on-state (YES in S120), the process proceeds to S122. If not so (NO in S120), the process is terminated.

In S122, ECU 200 determines whether or not integrated value IBs of current from the time point at which the overcharge tentative determination flag is switched from the off-state to the on-state is greater than or equal to threshold value IBs. In the case where integrated value IBs of current is greater than or equal to threshold value IBs(0) (YES in S122), the process proceeds to S124. If not so (NO in S122), the process is terminated.

In S124, ECU 200 determines that battery 70 is in the overcharging state. In S126, ECU 200 executes a fail safe process.

The operation of ECU 200 mounted on vehicle according to the present embodiment based on the structure and flowchart described above will be described with reference to FIGS. 5 and 6.

<The Case where Voltage Sensor 160 is in the Abnormal State>

Figure 5:
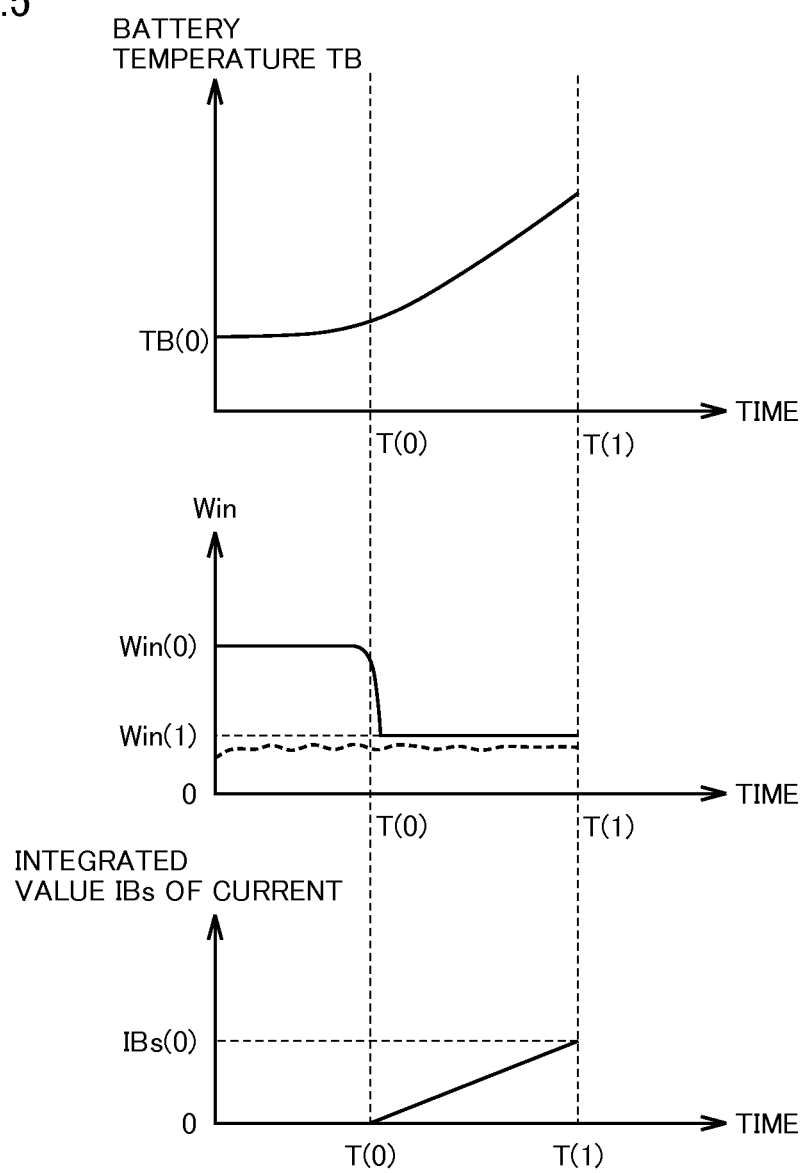
FIG. 5 is a (first) timing chart for describing an operation of the ECU mounted to the vehicle according to the present embodiment.

As shown in FIG. 5, the case is assumed where battery temperature TB is TB(0), and charging power upper limit value Win is normal value Win(0). For example, even though the SOC of battery 70 is in the state close to the fully charged state, an estimated value of the SOC in accordance with the voltage is within a predetermined range due to failure of voltage sensor 160.

Battery temperature TB is obtained from battery temperature sensor 156 (S100), and rising rate ΔTB of battery temperature TB is calculated (S102). Further, current IB is obtained from current sensor 158 (S104), and average value IBa of current IB is calculated (S106).

In the case where battery temperature TB rises due to continued charging, so that rising rate ΔTB becomes higher than or equal to threshold value ΔTB(0), and average value IBa of current IB exhibits a value on the side of charging at time T(0) (YES in S108), the overcharge tentative determination flag is turned to the on-state (S112), and limit value Win(1) is set as charging power upper limit value Win (S114).

The overcharge tentative determination flag is switched to the on-state (YES in S120), so that integration of charging current is started. Then, determination is performed on whether or not integrated value IBs of current after the overcharge tentative determination flag is switched from the off-state to the on-state is greater than threshold value IBs(0) (S122).

In the case where integrated value IBs of current is less than or equal to threshold value IBs(0) (NO in S122), the process from S100 is executed in the next calculation cycle. Unless rising rate ΔTB becomes lower than or equal to threshold value ΔTB(1), limitation on charging power upper limit value Win and integration of charging current continue. The power charged in the case where battery 70 is in the overcharging state is not stored but radiated as heat energy. Therefore, the rise in temperature of battery 70 continues along with continued charging.

In the case where integrated value IBs of current becomes greater than threshold value IBs(0) at time T(1) (YES in S122), battery 70 is determined as being in the overcharging state (S124), and the fail safe process is executed (S126).

<In the Case where Voltage Sensor 160 is in the Normal State>

Figure 6:
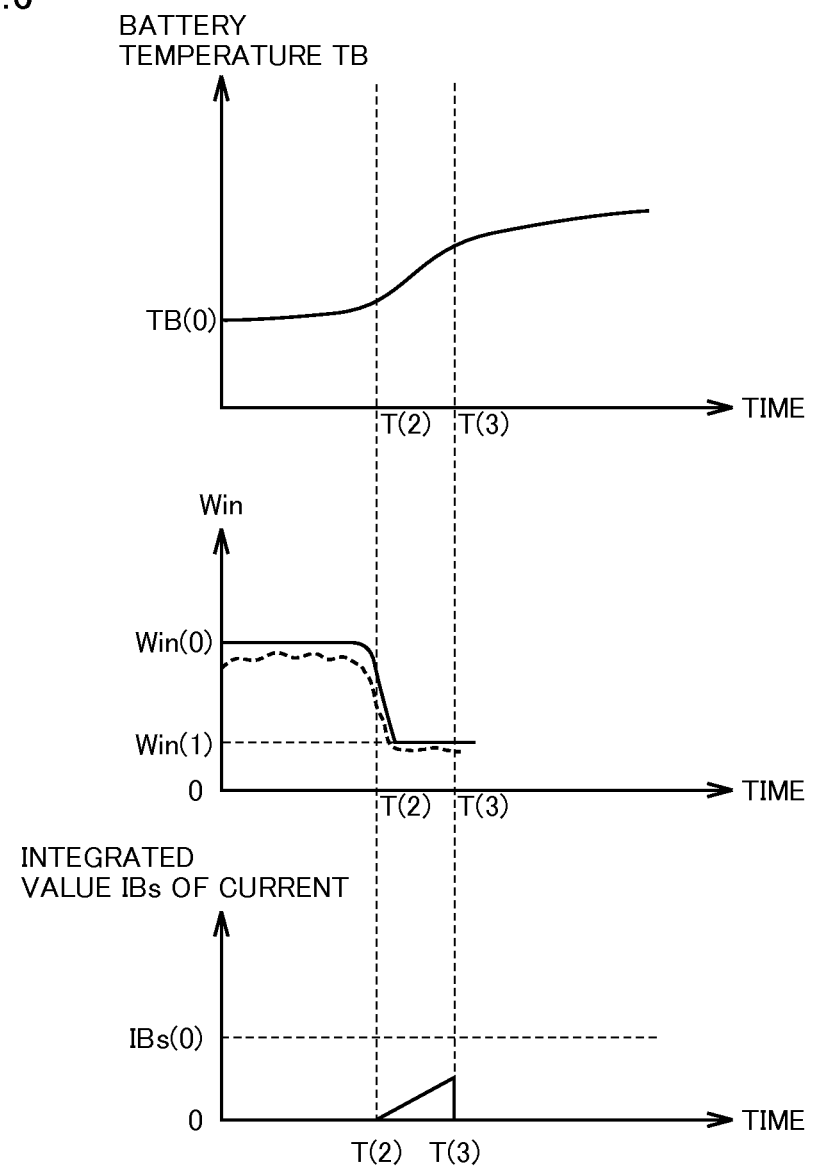
FIG. 6 is a (second) timing chart for describing an operation of the ECU mounted to the vehicle according to the present embodiment.

As shown in FIG. 6, for example, the case is assumed where battery temperature TB is TB(0), and charging power upper limit value Win is normal value Win(0). Further, the SOC of battery 70 is around a center of the predetermined range. Further, the case is assumed in which vehicle 1 continues running down a downward slope, and battery 70 is charged by execution of the regenerative control.

Battery temperature TB is obtained from battery temperature sensor 156 (S100), and rising rate $\Delta TB$ of battery temperature TB is calculated (S102). Further, current IB is obtained from current sensor 158 (S104), and average value IBa of current IB is calculated (S106).

Battery 70 is charged with use of the regenerative power, so that battery temperature TB rises. In the case where rising rate $\Delta TB$ becomes higher than or equal to threshold value $\Delta TB(0)$, and average value IBa of current IB exhibits a value on the side of charging at time T(2) (YES in S108), the overcharge tentative determination flag is turned on (S112), and limit value Win(1) is set as charging power upper limit value Win (S114).

The overcharge tentative determination flag is turned on (YES in S120), so that integration of charging current is started. Then, determination is performed on whether or not integrated value IBs of current after the overcharge tentative determination flag is switched from the off-state to the on-state is greater than threshold value IBs(0) (S122).

In the case where integrated value IBs of current is less than or equal to threshold value IBs(0) (NO in S122), the process from S100 is executed in the next calculation cycle. Charging power upper limit value Win is limited from normal value Win(0) to limit value Win(1), so that the amount of regenerative power to be received in battery 70 is lowered. Consequently, rising rate $\Delta TB$ of battery temperature TB is lowered.

In the case where rising rate $\Delta TB$ becomes less than or equal to threshold value $\Delta TB(1)$ at time T(3) (YES in S110), the overcharge tentative determination flag is turned to the off-state (S116), and limitation on charging power upper limit value Win is cancelled (S118). In other words, normal value Win(0) is set as charging power upper limit value Win. Consequently, battery 70 is not determined as being in the overcharging state (NO in S120).

As described above, with the vehicle according to the present embodiment, in the case where battery 70 is charged, and rising rate $\Delta TB$ of battery temperature TB becomes greater than or equal to threshold value $\Delta TB(0)$, charging power upper limit value Win is lowered. Accordingly, in the case where there is a possibility that battery 70 is in the overcharging state even under the low-temperature environment, charging power upper limit value Win of battery 70 can be limited appropriately. Further, in the case where charging continues in the state where charging power upper limit value Win is limited, and a rise in temperature of battery 70 continues, the overcharging state of battery 70 can be determined with high accuracy. Therefore, since the overcharging state of battery 70 can be specified, charging can be stopped promptly. Thus, a charge control apparatus and a charge control method can be provided which appropriately limit charging and promptly stop charging in the case where an abnormality occurs in the charge system.

Further, in the case where battery 70 is determined as being in the overcharging state, and the SOC in accordance with voltage sensor 160 is lower than the SOC corresponding to the fully charged state by greater than or equal to threshold value $\Delta SOC(0)$, abnormality of voltage sensor 160 can be determined with high accuracy.

In the present embodiment, ECU 200 is described as executing program on a steady basis in accordance with the flowchart shown in FIG. 4 in the case where the system of vehicle 1 is in operation, but is not limited to this. For example, ECU 200 may execute the program based on the flowchart shown in FIG. 4 during limited time periods, for example, at least any of the period during charging of battery 70 with use of an external power supply, during charging of battery 70 by regenerative control, and during charging of battery 70 with use of an engine.

In the present embodiment, it is described that charging power upper limit value Win is limited in the case where battery 70 is in the first state. However, charging power upper limit value Win as well as discharging power upper limit value Wout may also be limited. In such a manner, a factor of the rise in temperature of battery 70 is limited, so that whether or not battery 70 is in the overcharging state can be determined with a high accuracy. Further, in the case of limiting charging power upper limit value Wout, charging power upper limit value Wout may be limited so that the amount of change does not exceed the upper limit value, or may be limited gradually. In the case of limiting charging power upper limit value Wout, it is desirable to limit within a range at least allowing running of vehicle 1 in accordance with request by a driver.

The vehicle to which the invention is applied is only necessary to be a vehicle provided with a system controlling the amount of limitation on input/output of power of the electrical storage device, and it is not particularly limited to the hybrid vehicle having the configuration as shown in FIG. 1. The vehicle to which the present invention is applied may be a vehicle having the configuration shown in FIG. 1 and a charging device capable of charging battery 70 with use of an external power supply. Alternatively, the vehicle to which the present invention is applied may be a series-type hybrid vehicle, or a parallel-type hybrid vehicle. Alternatively, the vehicle to which the present invention is applied may be an electric vehicle as shown in FIG. 7.

Figure 7:
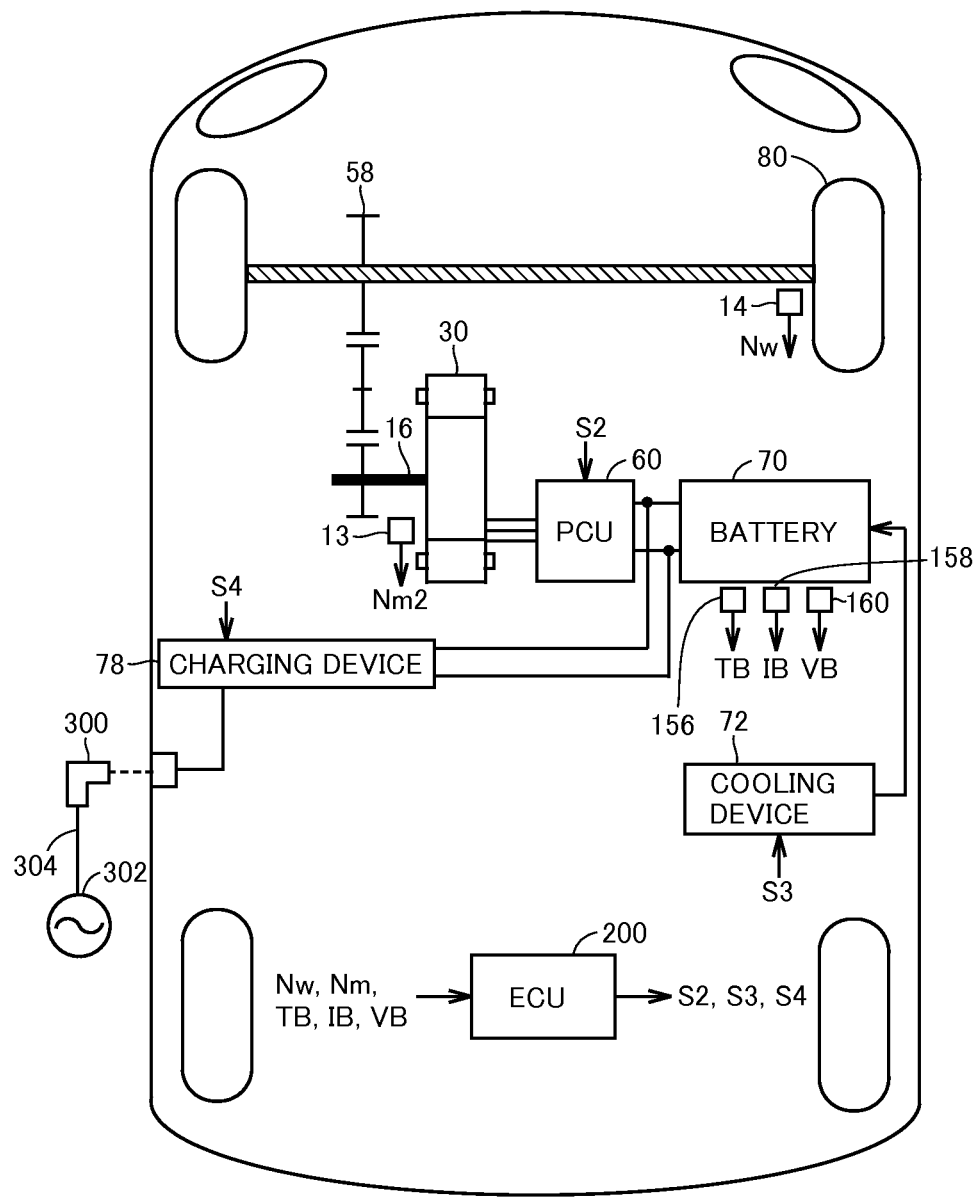
FIG. 7 represents an exemplary configuration of another vehicle.

Vehicle 1 shown in FIG. 7 is different from vehicle 1 shown in FIG. 1 in that components between motive power split device 40 and engine 10 are omitted, and in that a charging device 78 capable of charging with use of an external power supply 302 is included. The configuration other than those is the same as the configuration of vehicle 1 shown in FIG. 1.

Charging device 78 shown in FIG. 7 charges battery 70 with use of power supplied from external power supply 302 by attaching charging plug 300 to vehicle 1. Charging plug 300 is connected to one end of a charging cable 304. The other end of charging cable 304 is connected to external power supply 302. A positive electrode terminal of charging device 78 is connected to a power supply line connecting a positive electrode terminal of PCU 60 and a positive electrode terminal of battery 70. A negative electrode terminal of charging device 78 is connected to an earth line connecting a negative terminal of PCU 60 and a negative terminal of battery 70. Charging device 78 is operated in accordance with a control signal S4 from ECU 200.

In the case where the vehicle to which the present invention is applied is an electric vehicle as shown in FIG. 7, limit value Win(1) in the case where charging power upper limit value Win is limited is desirably a value capable of securing at least required deceleration when the accelerator is off. In the electric vehicle, deceleration at the time when the accelerator is off is performed by regenerative braking of the motor generator. Therefore, limit value Win (1) is preferably a value capable of receiving regenerative power generated by regenerative braking. An object to which the present invention is applied is not limited to a vehicle, and the present invention can be applied to a moving body (for example, a ship) provided with an electrical storage device.

Further, when cooling device 72 is in operation in the case where the temperature of the electrical storage device rises due to charging of battery 70, ECU 200 may maintain the operation amount of cooling device 72 while lowering charging power upper limit value Win. Alternatively, in the case where operation of cooling device 72 is started, ECU 200 may be set so as not to perform determination on whether or not battery 70 is in the overcharging state. In such a manner, erroneous determination caused by change in battery temperature due to operation of cooling device 72 can be prevented.

It should be understood that embodiments disclosed herein are illustrative and not restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 1 hybrid vehicle; 10 engine; 11 engine rotational speed sensor; 12, 13 resolver; 14 wheel speed sensor; 16 drive shaft; 20, 30 MG; 40 motive power split device; 50 sun gear; 52 pinion gear; 54 carrier; 56 ring gear; 58 reducer; 60 PCU; 70 battery; 72 cooling device; 78 charging device; 80 drive wheels; 102 cylinder; 104 fuel injection device; 156 battery temperature sensor; 158 current sensor; 160 voltage sensor; 200 ECU; 202 rising rate calculating unit; 204 average value calculating unit; 206 limit value setting unit; 208 integrated value calculating unit; 210 overcharge determining unit; 212 fail safe executing unit; 300 charging plug; 302 external power supply; 304 charging cable.

The invention claimed is:

1. A charge control apparatus for controlling charging of an electrical storage device for supplying power to electric equipment, the charge control apparatus comprising:
   a detection device for detecting a temperature of said electrical storage device; and
   a control device for lowering an upper limit value of charging power of said electrical storage device when the temperature of said electrical storage device rises due to charging of said electrical storage device, and determining that said electrical storage device is in an overcharging state when charging continues in a state where said upper limit value is lowered, and a rise in the temperature of said electrical storage device continues,
   wherein, based upon a rising rate of the temperature of said electrical storage device being higher than a first threshold value, said control device sets said upper limit value of said charging power to be lower as compared to a case where said rising rate is lower than said first threshold value, and
   when the temperature of said electrical storage device is high said control device sets said first threshold value so that said first threshold value is higher as compared to an instance where a temperature of said electrical storage device is low.

2. The charge control apparatus according to claim 1, wherein
   said detection device detects temperatures at a plurality of parts of said electrical storage device, and
   said control device lowers said upper limit value of said charging power when said rising rate of a temperature at any one part among the plurality of parts is higher than said first threshold value.

3. The charge control apparatus according to claim 1, wherein when charging continues until an integrated value of a current to said electrical storage device becomes greater than a predetermined value after said upper limit value of said charging power is lowered, and the rising rate of the temperature of said electrical storage device does not become lower than a second threshold value, said control device determines that said electrical storage device is in said overcharging state, and
   said second threshold value is a value less than or equal to said first threshold value.

4. The charge control apparatus according to claim 3, wherein in at least any one of a case where said rising rate is lower than said second threshold value and a case where said electrical storage device is discharging, said control device cancels lowering of said upper limit value of said charging power.

5. The charge control apparatus according to claim 1, wherein when said control device determines that said electrical storage device is in said overcharging state, said control device stops charging of said electrical storage device.

6. The charge control apparatus according to claim 1, wherein
   said electrical storage device is provided with a cooling device for cooling said electrical storage device, and
   when said cooling device is in operation in a case where a temperature of said electrical storage device rises due to charging of said electrical storage device, said control device does not change an operation amount of said cooling device while said upper limit value is lowered.

7. The charge control apparatus according to claim 1, wherein said electrical storage device is provided with a cooling device for cooling said electrical storage device, and
   when operation of said cooling device is started, said control device does not determine on whether or not said electrical storage device is in said overcharging state.

8. The charge control apparatus according to claim 1, wherein when the temperature of said electrical storage device rises due to charging of said electrical storage device, said control device lowers said upper limit value of said charging power and lowers an upper limit value of discharging power of said electrical storage device.

9. The charge control apparatus according to claim 1, wherein
   said charge control apparatus is mounted to a vehicle having an electric motor for driving, and
   said electrical storage device provides power to and receives power from said electric motor for driving.

10. A charge control method of controlling charging of an electrical storage device for supplying power to electric equipment, the charge control method comprising the steps of:
   lowering an upper limit value of charging power of said electrical storage device when a temperature of said electrical storage device rises due to charging of said electrical storage device; and determining that said electrical storage device is in an overcharging state when charging continues in a state where said upper limit value is lowered, and a rise in the temperature of said electrical storage device continues, wherein, based upon a rising rate of the temperature of said electrical storage device being higher than a first threshold value, setting said upper limit value of said charging power to be lower as compared to a case where said rising rate is lower than said first threshold value, and when the temperature of said electrical storage device is high, setting said first threshold value so that said first threshold value is higher as compared to an instance where a temperature of said electrical storage device is low.

* * * * *